United States Patent [19]

Aregger

[11] 3,913,133

[45] Oct. 14, 1975

[54] METHOD AND APPARATUS FOR AUTOMATIC REPEATED PRODUCTION OF INFORMATION ON SELECTED PORTIONS OF MAGNETIC WIRE OR TAPE

[76] Inventor: Alois Aregger, Mutschellenstrasse 33, 8002 Zurich, Switzerland

[22] Filed: Nov. 2, 1973

[21] Appl. No.: 412,440

[52] U.S. Cl. ........................ 360/72; 226/24; 360/74

[51] Int. Cl.$^2$ ................ G11B 15/18; G11B 19/06; G11B 15/26

[58] Field of Search ............. 360/72, 71, 74, 83, 90; 226/24, 43; 242/186, 188

[56] References Cited

UNITED STATES PATENTS

| | | | |
|---|---|---|---|
| 3,192,509 | 6/1965 | Durand et al. | 360/72 |
| 3,248,030 | 4/1966 | Ganzhorn | 360/72 |
| 3,344,416 | 9/1967 | Harford | 360/72 |
| 3,541,271 | 11/1970 | Joslow et al. | 360/72 |
| 3,571,524 | 3/1971 | Kozu et al. | 360/72 |
| 3,681,523 | 8/1972 | Sidline | 360/72 |

*Primary Examiner*—Alfred H. Eddleman
*Attorney, Agent, or Firm*—Michael S. Striker

[57] ABSTRACT

Apparatus which can be attached to or incorporated in a tape recorder for repeated automatic reproduction of information stored on a selected portion of magnetic wire or tape has a start button which is depressed to start a first counter when the user detects the foremost part of reproduction of information on the selected portion of wire or tape, and a stop button which is depressed to start a second counter when the user detects the end of information which is stored on the selected portion of wire or tape. At the same time the stop button causes a reversal in the direction of transport of the wire or tape and a movement of the sound head away from the wire or tape. The first counter is driven by the supply reel for the wire or tape during forward transport, and the second counter is driven while the supply reel rotates in a direction to collect the wire or tape whereby the first counter is reset to zero when the second counter assumes a position corresponding to that of the first counter at the end of reproduction of selected information. The resetting of first counter to zero position results in a return movement of the sound head into engagement with the wire or tape and in rotation of the takeup reel in a direction to collect the wire or tape. When the second counter is reset to zero, it automatically reverses the direction of movement of the wire or tape and causes the sound head to move away from the wire or tape. The counters may be operated mechanically or each thereof may constitute a digital counter.

19 Claims, 8 Drawing Figures

METHOD AND APPARATUS FOR AUTOMATIC REPEATED PRODUCTION OF INFORMATION ON SELECTED PORTIONS OF MAGNETIC WIRE OR TAPE

BACKGROUND OF THE INVENTION

The present invention relates to a method and apparatus for automatically reproducing selected portions of or the entire information which is stored on magnetic tape or wire. More particularly, the invention relates to improvements in a method and apparatus for automatically reproducing selected portions of or the entire information which is stored on an elongated carrier (hereinafter called tape) having ends connected to rotary takeup and supply devices. Still more particularly, a feature of the invention resides in improvements in an apparatus wherein magnetic tape is movable back and forth between a supply reel and a takeup reel and which embody means for changing the direction of movement of the tape and means for interrupting the transport of tape.

It is already known to record information on a magnetic sleeve which allows for repeated reproduction of the entire information which is recorded thereon. A drawback of apparatus utilizing magnetic sleeves is that they are not sufficiently versatile because they do not permit for repeated automatic reproduction of a selected portion of the recorded information. Moreover, the apparatus can accept only magnetic sleeves having a predetermined length (as considered in the circumferential direction of the sleeve). For example, such apparatus are not suited for use by students of languages who are desirous of repeatedly reproducing information which is recorded on a predetermined portion of the sleeve and/or of changing the length and/or location of the portion to be reproduced. There exists an urgent need for magnetic tape recorders which can be used for automatic reproduction of information stored on selected portions of the tape as well as for devices which can be incorporated in or attached to existing commercially available tape recorders to thus enable such apparatus to allow for automatic reproduction of information stored on selected portions of a magnetic tape which can be moved back and forth between rotary supply and takeup devices.

SUMMARY OF THE INVENTION

An object of the invention is to provide a novel and improved apparatus for automatic reproduction of information which is recorded on selected portions of magnetic tape.

Another object of the invention is to provide an apparatus of the just outlined character which enables the user to repeatedly reproduce an accurately selected portion of information which is recorded on magnetic tape.

A further object of the invention is to provide a novel and improved method of automatically reproducing selected portions of information which is stored on magnetic tape.

An additional object of the invention is to provide an apparatus which can constitute a self-supporting entity or an attachment to a conventional tape recorder.

Still another object of the invention is to provide an apparatus which is relatively simple, compact and rugged so that it can be properly manipulated by persons having little skill and/or knowledge of the construction of tape recorders.

A further object of the invention is to provide an apparatus which is particularly suited for use by students, especially students of languages, to allow for repeated reproduction of predetermined portions of information which is recorded on magnetic tape.

One feature of the invention resides in the provision of a method of automatically repeating the reproduction of information (e.g., sound) which is stored on a predetermined portion of an elongated magnetic record carrier in the form of wire or tape which is movable lengthwise forwardly and backwards. The method comprises the steps of moving the carrier forwardly and reproducing the information which is stored thereon, generating a first signal (e.g., by opening an electric switch in response to depression of a start button) at the start of reproduction of information on the predetermined portion of the carrier, monitoring the length of the carrier which is being transported forwardly subsequent to generation of the first signal (this can be achieved by using a suitable counter which moves from a zero position in response to generation of the first signal), generating a second signal (e.g., by opening a second switch in response to depression of a stop button) on completion of reproduction of information on the predetermined portion of the carrier, reversing the direction of movement of the carrier to backward in response to the second signal, monitoring the length of the carrier which is being transported backwards subsequent to generation of the second signal and continuously comparing the monitored length with the total length of that portion of the carrier which was transported forwardly during the interval between the first and second signals (this can be achieved by using a second counter which is operated forwardly while the first counter is operated rearwardly, starting with the generation of second signal), generating a third signal when the monitored length of the rearwardly transported portion of the carrier matches the total length of that portion which has been transported forwardly during the interval between the first and second signals, utilizing the third signal to move the carrier forwardly and simultaneously reproducing the information on the carrier portion which has been transported rearwardly in the preceding step (this portion corresponds to the predetermined portion of the carrier), simultaneously monitoring the length of the carrier which is being transported forwardly subsequent to generation of the third signal and comparing the monitored length with the total length of the rearwardly transported portion of the carrier, and generating a further second signal when the monitored length of the forwardly transported portion of the carrier (subsequent to the third signal) matches the total length of that carrier portion which was transported rearwardly in response to generation of the second signal. Such further second signal again initiates a rearward transport of the predetermined portion of the carrier and so forth, as long as the user wishes to repeatedly reproduce information on the predetermined portion.

Another feature of the invention resides in the provision of an apparatus for automatically repeating the reproduction of information which is stored on a selected portion of an elongated magnetic record carrier which is mounted on and extends between rotary supply and takeup devices. The apparatus comprises drive means (which may include an electric motor forming part of a conventional tape recorder) which is actuatable to move the carrier lengthwise, control means (e.g., a pivotable lever having a shifter which can connect the drive means with the supply device or with the takeup device) which is actuatable to select the direction of movement of the carrier, first and second counters (these counters may constitute mechanical or digital counters or a composite digital counter) each having a zero starting position, first and second operating means (e.g., a start button and a stop button) which are actuatable to respectively start the first and second counters at the onset and on completion of reproduction of information on the selected portion of the carrier, means (e.g., a worm, a flexible shaft, a pulse generator or the like) for respectively operating the first and second counters forwardly and backwards in response to rotation of the supply device in a direction to pay out the carrier and for respectively operating the first and second counters backwards and forwardly in response to rotation of the supply device in a direction to collect the carrier, first actuating means (e.g., an electric switch) for effecting a forward transport of the carrier in response to resetting of the first counter to zero position, and second actuating means (e.g., a second electric switch) for effecting a rearward movement of the carrier in response to resetting of the second carrier to zero position.

The first counter can be said to monitor that length of the carrier which is being transported forwardly in response to generation of a first signal on actuation of the first operating means, and the second counter can be said to monitor that length of the carrier which is being transported rearwardly in response to generation of a second signal on actuation of the second operating means. As the first counter runs backwards and the second counter runs forwardly, the two counters compare the length of the carrier which was transported forwardly after generation of the first signal with the length of the carrier which is being transported rearwardly on generation of the second signal. A third signal is generated by the first actuating means when the measured length of the rearwardly transported carrier subsequent to generation of the second signal matches the total length of the carrier which was transported forwardly during the interval between the first and second signals. A further second signal is generated by the second actuating means when the forward transport of the predetermined portion of the carrier is completed for the second time, and such further second signal is used to again reverse the direction of movement of the carrier.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
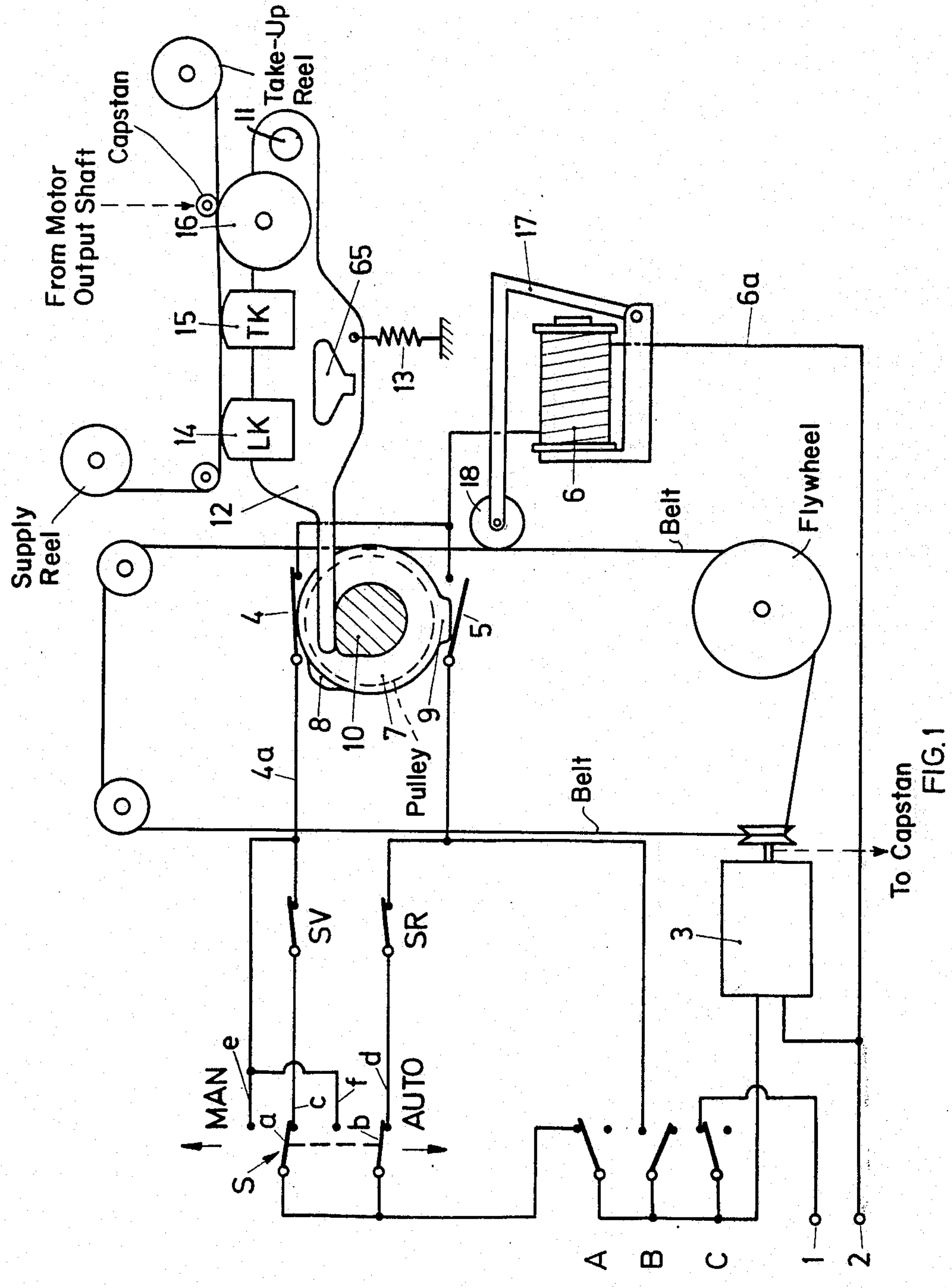
FIG. 1 is a fragmentary diagrammatic partly sectional view of an apparatus which embodies the invention, showing the manner in which the transport of tape can be started or interrupted.

Referring first to FIG. 1, there is shown a portion of a tape recorder incorporating an apparatus which embodies the invention. The various electric switches of FIG. 1 are shown in positions they assume when the apparatus is set to automatically repeat the reproduction of information on a selected portion of a magnetic tape, not shown. The ends of such tape are connected to the cores of a supply reel 70 and a takeup reel 69, both shown in FIG. 5, and a portion of the tape extends between the two cores.

The terminals 1, 2 shown in FIG. 1 are connected to a suitable source of DC current. The terminal 1 is connected with the movable contacts *a, b* of a two-pole master switch S through the medium of two electric switches A and C which are closed. The master switch S is indirectly actuated by a selector knob 22 (see FIGS. 2 and 3) and serves to select the mode of operation, i.e., either manual (MAN) or automatic (AUTO). The fixed contact *c* of the selector switch S is in series with a first actuating switch $S_V$ and with a cam-actuated switch 4. The fixed contact *d* of the master switch S is in series with a second actuating switch $S_R$ and with a second cam-actuated switch 5. The fixed contacts *e, f* of the master switch S are connected to each other and to conductor means 4*a* between the switches $S_V$ and 4 so that the actuating switch $S_V$ is bypassed when the master switch S is set for manual operation, i.e., when the moving contacts *a, b* respectively engage the fixed contacts *e, f.* The fixed contacts of the switches 4, 5 are connected to each other and to the winding of a relay 6 which is further connected to the terminal 2 via conductor 6*a.*

Closing of the switch C results in completion of the circuit of an electric motor 3 which preferably constitutes the main prime mover of the tape recorder.

The means for opening and closing the switches 4, 5 comprises a rotary disk-shaped cam 7 having two projections or lobes 8, 9 which respectively serve to move the movable contacts of the switches 4 and 5. The cam 7 may constitute a disk having a cylindrical peripheral surface from which the lobes 8, 9 extend outwardly. A second cam 10 is rigid with the cam 7 and serves to pivot a holder or support 12 for two magnetic heads 14, 15 and a pressure roll 16. The holder or support 12 is a one-armed lever which is pivotable on a fixed pin 11 and is biased against the cam 10 by a helical spring 13. The head 14 is an erasing head and the head 15 is a sound head. In the angular position of FIG. 1, the cam 10 maintains the support 12 in an angular position in which the pressure roll 16 is spaced apart from the customary capstan (not shown) so that the magnetic tape is at a standstill. The pressure roll 16 can be said to form part of the means for transporting the magnetic tape lengthwise.

The relay 6 constitutes a means for establishing or terminating a torque-transmitting connection between the motor 3 and the shaft for the cams 7, 10. As shown, the relay 6 comprises a pivotable armature 17 which carries a roller 18. When the relay 6 is energized, the armature 17 is pivoted counterclockwise, as viewed in FIG. 1, and thereby causes the roller 18 to operatively connect the output shaft of the motor 3 with the shaft for the cams 7, 10. For example, the shaft for the cams 7 and 10 can be provided with a pulley which is adjacent to one stretch of a belt connecting the output shaft of the motor 3 with the flywheel of the tape recorder. When the relay 6 is energized, the roller 18 deflects the belt so that the latter drives the pulley on the shaft for the cams 7 and 10. When the relay 6 is deenergized, the roller 18 is disengaged from the belt so that the latter ceases to rotate the cams 7 and 10. The manner in which the movements of moving contacts of the switches 4 and 5 are synchronized with opening and closing of the actuating switches $S_V$ and $S_R$ will be described hereinafter.

Figure 2:
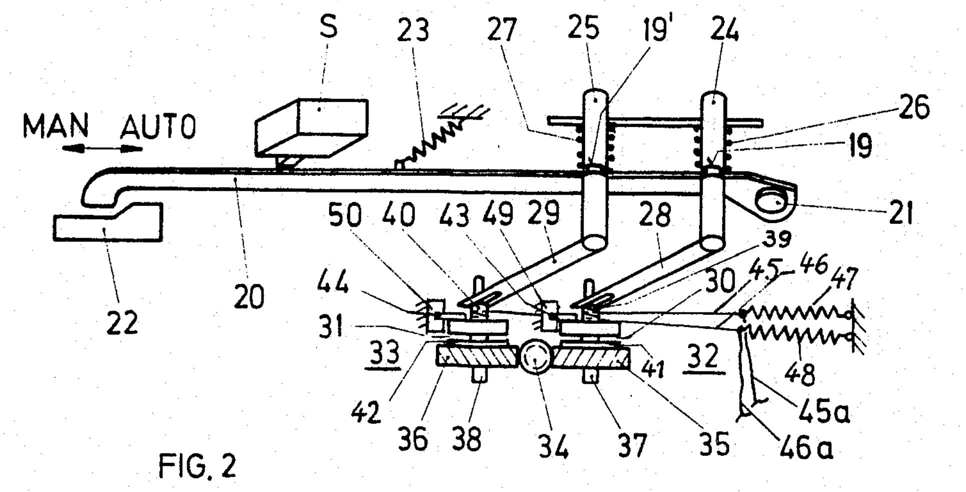
FIG. 2 is an enlarged fragmentary partly perspective and partly vertical sectional view substantially as seen in the direction of arrows from the line II—II of FIG. 6 and shows the details of the two counters.
Figure 3:
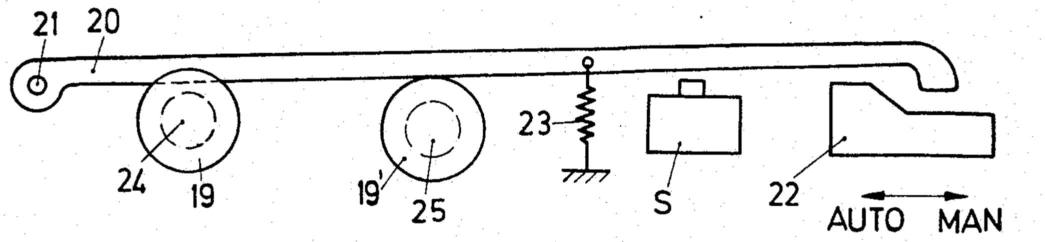
FIG. 3 is a plan view of a portion of the structure shown in FIG. 2.

FIGS. 2 and 3 illustrate certain details of mechanical parts of the automatic repeating apparatus. An arresting lever 20 is mounted on a pivot member 21 and is biased by a helical spring 23 so that it tends to turn clockwise, as viewed in FIG. 3. The manually operable selector knob 22 is mounted in or on the housing of the tape recorder to pivot the arresting lever 20 against the opposition of the spring 23 (manual operation) or to allow the spring 23 to pivot the lever 20 (automatic operation). When the selector knob 22 is moved in a direction to the right, as viewed in FIG. 3, the arresting lever 20 assumes an inoperative position in which it cannot engage and retain in depressed position a first operating member here shown as a start button 24 and/or a second operating member or stop button 25. The arrangement is such that a pivotal movement of the arresting lever 20 under the action of the helical spring 23 through a first angle results in engagement of the lever 20 with a shoulder 19 of the start button 24 and that a further pivotal movement of the arresting lever 20 results in engagement of this lever with a shoulder 19' of the stop button 25. Thus, when the selector knob 22 dwells in the position of FIG. 3 and the operator depresses the start button 24 against the opposition of a spring 26, the arresting lever 20 engages the shoulder 19 and prevents a return movement of the start button 24 under the action of the spring 26. If the operator thereupon depresses the stop button 25 against the opposition of a spring 27, the arresting lever 20 engages the shoulder 19' and prevents a return movement of the stop button 25 under the action of the spring 27. The arresting lever 20 actuates the master switch S only in response to depression of the stop button 25 while the selector knob 22 assumes the position shown in FIG. 3. The movable contacts *a, b* of the master switch S then assume the positions shown in FIG. 1.

The lower end portions (as viewed in FIG. 2) of the operating members or buttons 24, 25 respectively carry resilient elements in the form of leaf springs 28, 29 having bifurcated outer ends which form claws serving to engage two discrete clutches 30 and 31. The engagement of clutch 30 results in starting of a forward counter 32 and the engagement of clutch 31 results in starting of a backward or rearward counter 33. The counters 32 and 33 are driven by the supply reel 70 for magnetic tape. The supply reel 70 drives a worm 34 which meshes with two worm wheels 35, 36 respectively forming first rotary elements of the counters 32 and 33. The worm wheels 35, 36 rotate in opposite directions and are respectively mounted on shafts 37, 38 secured to the housing of the tape recorder. The extent of angular displacement of the supply reel 70 is proportional to the extent of angular displacement of the shafts 37, 38. For example, the shaft 37 will rotate clockwise when the supply reel 70 rotates in a direction to pay out the tape, and the shaft 38 will rotate counterclockwise when the supply reel 70 is rotated in a direction to collect the tape. A portion of the information which is stored on the tape is reproduced when the shaft 37 rotates clockwise, and such portion is transported backwards when the shaft 37 rotates anticlockwise.

The shafts 37, 38 respectively support clutch disks 39 and 40 which respectively constitute second rotary elements of the counters 32 and 33. The leaf spring 28 urges the clutch disk 39 against a lining 41 of the worm wheel 35 in response to depression of the start button 24, and the spring 29 urges the clutch disk 40 against a similar lining 42 of the worm wheel 36 in response to depression of the stop button 25. Each of the linings 41, 42 may constitute a washer consisting of rubber or another suitable elastomeric material. These linings are preferably glued or otherwise secured to the respective worm wheels.

The clutch disks 39, 40 respectively carry movable electric contacts 43 and 44 and these disks are respectively urged to predetermined starting positions by flexible resetting cables 45, 46 which are connected to the housing of the tape recorder by means of helical springs 47, 48. The direction in which the clutch disk 39 rotates when it is disengaged from the lining 41 is the same in which the disk 40 rotates in response to disengagement from the lining 42. When the springs 47 and 48 are free to contract, i.e., in non-depressed positions of the buttons 24, 25, the contacts 43, 44 respectively engage stationary contacts 49 and 50. The contacts 43, 49 together constitute the first actuating switch $S_V$, and the contacts 44, 50 together constitute the second actuating switch $S_R$. Thus, the actuating switches $S_V$ and $S_R$ are closed when the clutch disks 39, 40 are allowed to assume their predetermined starting positions in which the contacts 43, 44 respectively engage the contacts 49, 50. In other words, the actuating switch $S_V$ is closed in disengaged condition of the clutch 30, and the actuating switch $S_R$ is closed in disengaged condition of the clutch 31. The cables 45, 46 preferably constitute conductors which connect the respective contacts 43, 44 with the corresponding fixed contacts *c, d* of the master switch S (see FIG. 1). Each of the cables 45, 46 can constitute an electric conductor which is surrounded by an insulating sheath. The bare portions of such conductors are shown in FIG. 2, as at 45*a*, 46*a*. It is clear, however, that the contacts *c*, *d* of the master switch S can be connected with the moving contacts 43, 44 by other types of conductors, for example, by sliding contacts which bear against the respective clutch disks 39, 40 and are electrically connected with the corresponding contacts 43, 44 by way of current-conducting portions of the respective clutch disks.

The motion transmitting connection between the supply reel 70 and the worm wheels 35, 36 preferably constitutes a step-down transmission whose ratio is such that the clutch disks 39, 40 which respectively constitute the second rotary elements of the counters 32, 33 at most complete one full revolution in response to transport of an entire tape from the supply reel 70 to the takeup reel 69 (forward transport) for from the takeup reel back to the supply reel (backward transport). Any suitable step-down transmission can be used, as long as the clutch disk 39 or 40 does not complete a full revolution in response to transport of the entire tape from the reel 69 to the reel 70 or vice versa. The arrangement is preferably such that the maximum angular displacement of the clutch disk 39 or 40 does not exceed 320°; this prevents the contacts 43, 44 from engaging the fixed contacts 49, 50 except when the respective clutch disks 39, 40 assume the aforementioned predetermined starting positions under the action of the springs 47 and 48.

The springs 47, 48 perform another desirable and advantageous function, namely to reduce play between the movable parts of the clutches 30 and 31. This insures that the apparatus can repeatedly reproduce a selected portion of information which is recorded on the tape with a surprisingly high degree of accuracy. As shown in FIG. 2, the springs 47, 48 invariably urge the respective clutch disks 39, 40 to their starting positions so that the contacts 43, 44 automatically and immediately return into engagement with the contacts 49, 50 to close the respective actuating switches $S_V$ and $S_R$ as soon as the leaf springs 28, 29 allow the clutch disks 39, 40 to rotate relative to the associated worm wheels 35, 36.

Figure 4:
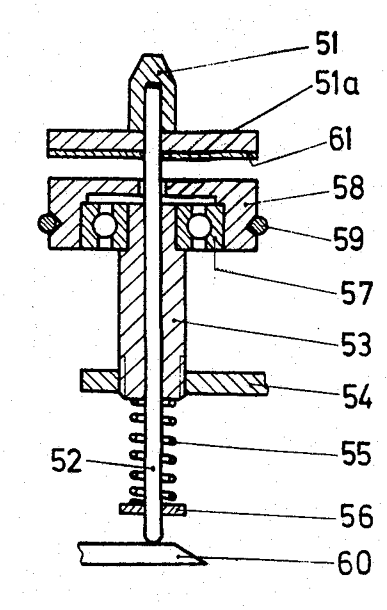
FIG. 4 is an enlarged sectional view as seen in the direction of arrows from the line IV—IV of FIG. 6 and shows the manner in which the counters can be driven by the takeup reel for magnetic tape.

The manner in which a spindle 51 for the supply reel 70 can be coupled with or disengaged from the drive means therefor is shown in FIG. 4. The mounting of the spindle 51a (see FIG. 6) for the takeup reel 69 is preferably similar to or identical with that of the spindle 51. The latter is secured to an elongated rod or post 52 which is movable axially in a bearing sleeve 53 and carries at its lower end a disk 56. The reference character 54 denotes a portion (e.g., the deck) of the housing of the tape recorder and this portion supports the sleeve 53. A helical spring 55 which reacts against the lower end of the sleeve 53 bears against the disk 56 and tends to move the post 52 (and hence the spindle 51) downwardly, as viewed in FIG. 4. When the spring 55 is free to expand, the lining 61 at the underside of a disk-shaped portion 51*a* of the spindle 51 engages the upper side of a turntable 58 here shown as a sheave which is driven by the motor 3 through the medium of an endless flexible element 59 and rotates on an antifriction bearing 57. In order to disengage the lining 61 from the sheave 58, a shifter 60 on a control lever 62 (see FIG. 5) must move the post 52 upwardly so as to stress the spring 55. The flexible element 59 drives the sheave 58 when the tape must be transported from the takeup reel 69 toward the supply reel 70, i.e., during rewinding of tape onto the core of the supply reel. When the shifter 60 moves the post 52 upwardly, the spindle 51 is disengaged from the sheave 58 and the tape can be transported forwardly in response to rotation of the takeup reel 69 and spindle 51a in a direction to collect the tape. The post 52 constitutes or forms part of the means for rotating the worm 34 of FIG. 2. The worm 34 can be provided directly on the post 52 so that it rotates in response to rotation of the spindle 51 for the supply reel 70, or the apparatus may comprise one or more motion transmitting elements which rotate the worm 34 clockwise or counterclockwise in response to movement of the lining 61 into engagement with the sheave 58.

Figure 5:
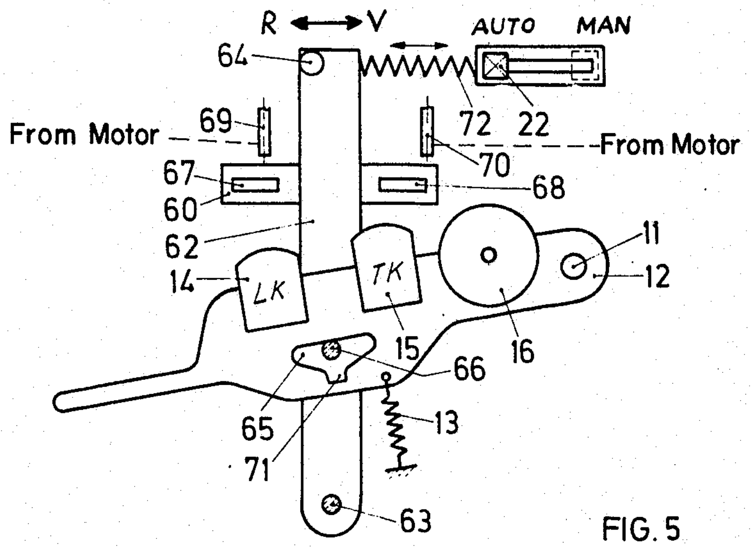
FIG. 5 is a plan view of a detail, showing the manner in which a control member which determines the direction of movement of magnetic tape cooperates with a support for the magnetic heads.

Referring to FIG. 5, there are shown certain conventional parts of the tape recorder together with certain of the aforedescribed and certain additional parts of the improved apparatus for automatic reproduction of selected portions of recorded information. The conventional parts may be installed and operated in the customary manner or with minor modifications in view of the provision of automatic repeating or reproducing apparatus.

FIG. 5 again shows the support 12, its pivot pin 11, the magnetic heads 14, 15 and the pressure roll 16. The support 12 is loosely coupled with a manually or automatically actuatable control lever 62 which indirectly receives motion from the selector knob 22 when the improved apparatus is in use. The control lever 62 serves to select the direction of transport of the tape between the reels 69 and 70. As shown, the control lever 62 is pivotably mounted in the frame of the tape recorder on a pivot pin 63 and its free end carries a "rewind" knob 64 which is accessible from without. The support 12 is formed with a substantially triangular opening or cutout 65 including a downwardly extending portion or notch 71 and receiving a pin-shaped follower 66 on an intermediate portion of the control lever 62. A portion of the surface surrounding the opening 65 is biased against the follower 66 by the spring 13. It is clear that the opening 65 can be provided in the control lever 62 and that the follower 66 can be mounted on the support 12. The control lever 62 further carries the shifter 60 which couples the spindle 51 to the sheave 58 of FIG. 4 when the control lever is pivoted counterclockwise, as viewed in FIG. 5 (see the mark R). The shifter 60 causes the spindle 51a for the takeup reel 69 to receive torque from the drive means therefor when the control lever 62 is pivoted clockwise (see the mark V). As mentioned above, the supply reel 70 can be driven to transport the tape rearwardly and the supply reel 69 can be driven to advance the tape forwardly. The shifter 60 is provided with wedge-like portions or ramps 67, 68 which serve to lift the respective posts (see the post 52 of FIG. 4) so that the corresponding spindles 51, 51a receive torque from the drive including the sheave 58 and a similar sheave for the takeup reel 69. It will be noted that the spindle 51 for the supply reel 70 is driven when the spindle 51a for the takeup reel 69 is disengaged from the drive, and vice versa.

The configuration of the opening 65 in the support 12 is such that the control lever 62 is free to move between the positions "V" and "R" when the support 12 disengages the portions or parts 14, 15 and 16 from the tape between the reels 69 and 70. When the support 12 is pivoted clockwise, as viewed in FIG. 5, so that the parts 14, 15 and 16 engage the tape, the follower 66 enters the notch 71 of the support 12 so that the control lever 62 is arrested in an intermediate position. Once the follower 66 has entered the notch 71, the control lever 62 can return to the position R or V only after the support 12 has been caused to disengage the parts 14–16 from the tape, i.e., after the support 12 returns to the position of FIG. 5. This can be achieved by closing an auxiliary switch B which is shown in FIG. 1 and serves to energize the relay 6, either by way of the switch 4 or by way of the switch 5. The switch B is connected in parallel with the actuating switch $S_R$.

When the apparatus is set to automatically reproduce a selected portion of information on magnetic tape, the tape is automatically transported backwards as soon as a reproduction is completed. To this end, the control lever 62 must be moved to the position R (rewind) upon movement of the support 12 to the position of FIG. 5, i.e., in response to movement of the parts 14–16 away from the tape between the reels 69 and 70. This is achieved by the provision of a resilient pivoting device here shown as a helical spring 72 which is interposed between the control lever 62 and the selector knob 22. If the selector knob 22 assumes the position for automatic reproduction of a selected portion of information on the tape, the spring 72 stores energy and biases the control lever 62 counterclockwise, as viewed in FIG. 5. The control lever 62 can pivot to the position R under the action of the spring 72 only when the support 12 is returned to the position of FIG. 5, i.e., when the parts 14–16 are disengaged from the tape. This is due to the fact that the follower 66 extends into the notch 71 and locks the control lever 62 in an intermediate position (between the positions R and V) when the support 12 is pivoted counterclockwise to move the parts 14–16 into engagement with the tape. The spring 72 is ineffective when the selector knob 22 is moved to its right-hand position, as viewed in FIG. 5; the tape recorder is then ready for normal operation in a conventional manner.

Figure 6:
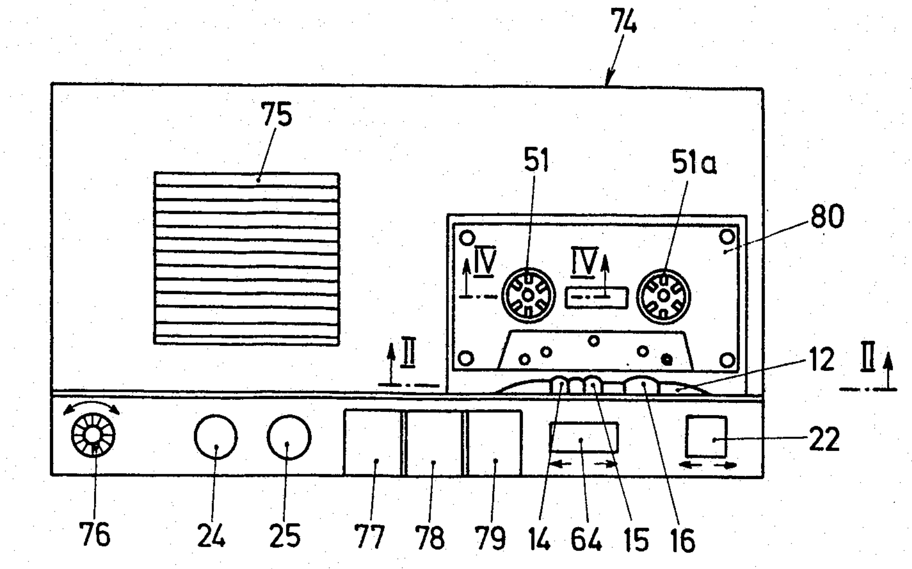
FIG. 6 is a plan view of a cassette tape recorder which embodies the invention.

A tape recorder 74 which embodies the structure of FIGS. 1 to 5 is shown in FIG. 6. This illustration shows a loudspeaker 75, a volume control knob 76, the start and stop buttons 24, 25, the "play" knob 77, the "record" knob 78, the "stop" knob 79, the rewind knob 64, the selector knob 22, a portion of the support 12 with the heads 14, 15 and pressure roll 16, a compact cassette 80, the spindle 51 for the supply reel 70, and the spindle 51*a* for the takeup reel 69. The parts 75–79 constitute conventional components of the tape recorder and the parts 24, 25, 64 and 22 constitute the accessible components of the improved apparatus for automatic reproduction of selected portions of information on magnetic tape in the cassette 80. The parts 24, 25 are depressible and the parts 64, 22 are movable to the right or to the left, as indicated by arrows.

The operation:

When the tape recorder of FIG. 6 is to record or reproduce information in the customary way, its parts 75 to 79 are operated in a manner well known from the art.

If the operator wishes to repeatedly listen to information which is recorded on a selected portion of the tape whose ends are secured to the cores of the reels 69 and 70, the selector knob 22 is shifted to the position AUTO so that the spring 72 of FIG. 5 stores energy and urges the control lever 62 in a direction to the left, i.e., to the position R. The operator inserts a cassette 80 while the support 12 assumes the position of FIG. 1 or 5, i.e., a position in which the pressure roll 16 and the magnetic heads 14, 15 are spaced apart from that portion of the tape which extends between the reels 69, 70 of the properly inserted cassette. The switch 5 of FIG. 1 is open.

The operator thereupon depresses a button or knob which closes the switch A of FIG. 1. This switch is preferably coupled to the switch C so that the switches A and C close as a unit. The arresting lever 20 cannot move the movable contacts *a*, *b* of the master switch S to the positions shown in FIG. 1 as long as the operating members or buttons 24, 25 dwell in their extended positions (see FIGS. 2 and 3). Thus, the master switch S remains in the position MAN so that its moving contacts *a* and *b* respectively engage the fixed contacts *e* and *f* and thus bypass the actuating switch $S_V$. The switch 4 is closed because its movable contact is not engaged by the lobe 8 of the cam 7 so that the relay 6 is energized and pivots the armature 17 counterclockwise whereby the roller 18 couples the shaft for the cams 7, 10 to the output shaft of the motor 3 and the cams 7, 10 begin to rotate. The cam 10 thereby causes the support 12 to pivot clockwise, as viewed in FIG. 1 or 5, so that the spring 13 stores energy and the parts 14–16 engage the tape between the reels 69 and 70 in the cassette 80 of FIG. 6. The follower 66 of the control lever 62 enters the notch 71 of the opening 65 and the control lever thus assumes the aforementioned intermediate position between the positions R and V shown in FIG. 5.

As the cam 7 and 10 rotate, the lobe 9 moves beyond the movable contact of the switch 5 so that the switch 5 closes while the lobe 8 opens the switch 4. Since the master switch S still assumes the position MAN, the relay 6 becomes deenergized in response to opening of the switch 4 in spite of the fact that the actuating switch $S_R$ (contacts 44, 50) is closed. Consequently, the shaft for the cams 7, 10 is disconnected from the output shaft of the motor 3 and the cams 7, 10 come to a halt in angular positions in which the switches 4 and 5 are respectively open and closed and the support 12 maintains the parts 14–16 in engagement with the tape. The pressure roll 16 bears against the tape opposite the capstan which is driven by the motor 3 so that the tape is transported lengthwise and the recorder reproduces the sound which is stored on the tape.

The operator listens to the sounds emitted by the loudspeaker 75 and depresses the start button 24 when he detects the foremost part of that passage which is to be automatically reproduced. This enables the arresting lever 20 to pivot clockwise (under the influence of spring 23) to the position shown in FIG. 3 in which the lever 20 engages the shoulder 19 and holds the start button 24 in the depressed position. The movable contacts *a* and *b* of the master switch S continue to engage the fixed contacts *e* and *f*. The depressed start button 24 causes the leaf spring 28 to engage the clutch 30 by biasing the clutch disk 39 against the lining 41 of the worm wheel 35 which is driven by the worm 34 because the supply reel 70 rotates in a direction to pay out the tape. The movable contact 43 of the actuating switch $S_V$ moves away from the fixed contact 49 to open the switch $S_V$. The rate at which the contact 43 moves away from the contact 49 is proportional to the speed of the takeup reel 70.

When the operator hears the end of the passage which is to be repeated, he depresses the stop button 25. The spring 23 is then free to pivot the arresting lever 20 beyond the position shown in FIG. 3 so that the lever 20 engages the shoulder 19' of the stop button 25 and simultaneously actuates the master switch S, i.e., the moving contacts *a*, *b* of the switch S respectively engage the fixed contacts *c*, *d*. At such time, the actuating switch $S_V$ is already open and the switch 5 is closed. The circuit of the relay 6 is completed via switches S and $S_R$ (the latter is closed because the clutch 31 is disengaged) and the roller 18 couples the output shaft of the motor 3 with the shaft for the cams 7 and 10. The lobe of the cam 10 moves beyond the adjacent end portion of the support 12 so that the spring 13 is free to move the parts 14–16 away from the tape and the notch 71 of the opening 65 in the support 12 releases the follower 66 of the control lever 62. The spring 72 is free to move the control lever 62 to the position R of FIG. 5. The shifter 60 allows the spindle 51 to move its lining 61 into engagement with the sheave 58 so that the supply reel 70 rotates in a direction to collect the tape. At the same time, the spindle 51*a* for the takeup reel 69 is disengaged from its drive (by the ramp 67 of the shifter 60) so that the takeup reel allows the supply reel 70 to collect the tape. As a rule, the speed of rearward movement of tape exceeds the speed of forward transport.

In response to depression of the stop button 25, the leaf spring 29 engages the clutch 31 by moving the clutch disk 40 against the lining 42 of the worm wheel 36. Since the worm 34 rotates in opposite direction, the movable contact 43 of the actuating switch $S_V$ moves toward the contact 49 and the movable contact 44 moves away from the contact 50 so that the actuating switch $S_R$ opens. The actuating switch $S_V$ closes when the contact 43 reengages the contact 49. The switch 4 is also closed so that the relay 6 is energized as soon as the actuating switch $S_V$ closes whereby the roller 18 causes the motor 3 to drive the shaft for the cams 7 and 10 until the lobe 8 opens the switch 4 and the lobe of the cam 10 causes the support 12 to move the parts 14–16 into engagement with the magnetic tape. The support 12 causes the control lever 62 to assume its intermediate position in which the follower 66 extends into the notch 71 of the opening 65. The shifter 60 of the control lever 62 disengages the spindle 51 for the supply reel 70 from the sheave 58 and engages the spindle 51a with the respective drive so that the takeup reel 69 begins to rotate in a direction to collect the tape. The supply reel 70 is rotated by the tape and rotates the worm 34 in a direction to move the contact 43 away from the contact 49 (the actuating switch $S_V$ opens) as well as to move the contact 44 toward the contact 50. The apparatus reproduces, for the second time, the information which is stored on the selected portion of the tape, and such reproduction is terminated automatically as soon as the worm 34 closes the actuating switch $S_R$. The same operation is repeated again and again, as long as the selector knob 22 remains in the position AUTO.

When the operator moves the selector knob 22 to the position MAN, the arresting lever 20 is disengaged from the shoulders 19, 19' of the buttons 24, 25 so that the buttons 24, 25 reassume their extended positions under the action of the respective springs 26, 27. This causes the clutch disks 39, 40 to become disengaged from the respective worm wheels 35, 36 whereby the springs 47, 48 return the contacts 43, 44 into engagement with the contacts 49, 50, i.e., the actuating switches $S_V$ and $S_R$ close in automatic response to disengagement of the clutches 30, 31 because the counters 32, 33 are reset to zero. The master switch S maintains its contacts *a*, *b* in engagement with the contacts *e*, *f* and the tape recorder is ready for normal operation. The operator can select a different portion of the tape for automatic reproduction by depressing the start button 24 at the start of reproduction of information on such selected portion of the tape and by thereupon depressing the stop button 25 when the apparatus completes the reproduction of a selected passage.

Figure 7:
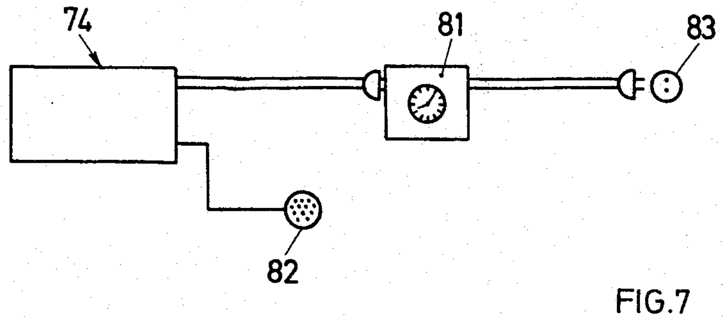
FIG. 7 shows the recorder of FIG. 6 with a clock which determines the duration of automatic reproduction of information on a selected portion of magnetic tape.

FIG. 7 shows the tape recorder 74 of FIG. 6 in combination with a timer clock 81 and an earphone 82. The timer clock 81 is connectable between an energy source 83 and the tape recorder 74 and can be set to interrupt the connection between the recorder 74 and the source 83 after elapse of a selected interval of time and/or to select a certain period of repeated reproduction, for example, between 3 and 4 AM. The user attaches the earphone 82 to his head and the corresponding output of the recorder 74, sets the clock 81, and goes to bed. The clock 81 then insures that the reproduction continues for a selected interval of time or that the reproduction begins after one or more hours of rest. The circuitry which is used in the tape recorder 74 to enable it to be operated with the earphone 82 and clock 81 can be similar to that in conventional disk recorders for learning purposes.

Figure 8:
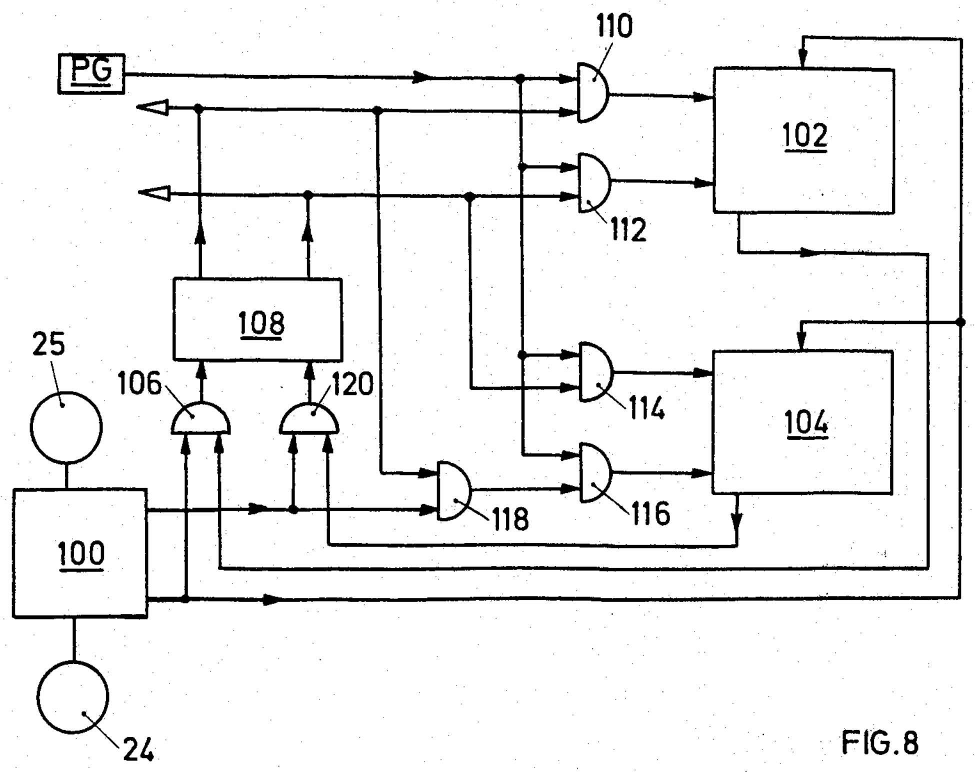
FIG. 8 is a diagram of a modified apparatus with digital counters.

FIG. 8 shows an apparatus which employs two digital counters 102, 104 as a substitute for the counters 32, 33 of FIG. 2. These digital counters are driven by a conventional pulse generator PG which is connected to the spindle 51 (not shown) for the supply reel. The counter 102 is connected for forward counting and the counter 104 is connected for backward counting, i.e., during rewinding of tape onto the supply reel. It is further within the purview of the invention to employ a combined digital counter which is triggered in forward direction during normal reproduction operation and backward during rewinding of tape, until the counter is reset to zero.

The operation of the apparatus of FIG. 8 is as follows: When the operator depresses the start button 24, the output "1" of a bistable circuit 100 transmits a signal to the resetting inputs of the counters 102, 104 so that the counters are reset to zero. At the same time, an OR-gate 106 transmits a signal to the input 1 of a second bistable circuit 108 which activates an AND-gate 110 so that the counter 102 begins to count the pulses furnished by the pulse generator PG.

When the operator depresses the stop button 25, the output "0" of the bistable circuit 100 transmits a signal to the AND-gates 118, 120. The AND-gate 120 is then open for zero count from the counter 104 and switches the bistable circuit 108 to 0 condition. This deactivates the AND-gate 110 and activates the AND-gates 112, 114. At the same time, the "backwind" control of the recorder (see 64 in FIG. 6) is activated. The counter 102 runs rearwardly and the counter 104 runs forwardly until the counter 102 reaches zero. The OR-gate 106 causes the bistable circuit 108 to transmit a signal at the output 1 as soon as the counter 102 is reset to zero. The output signal from the circuit 108 passes the AND-gate 118 and is transmitted to the corresponding input of the AND-gate 116. The AND-gate 110 is activated together with the play control of the recorder (see 77 in FIG. 6). The information on the selected portion of the tape is reproduced until the counter 104 reaches zero. The zero-signal from the counter 104 passes the AND-gate 120 which also receives a signal from the 0 output of the circuit 100. The operation is repeated again and again, until the stop-control (see 79 in FIG. 6) of the recorder is activated. U.S. Pat. No. 3,681,523 shows in detail various elements of the circuit shown in FIG. 8, or else indicates such elements to be generally known in the art.

As explained above, the invention can be embodied in an apparatus which is built into a tape recorder or in a separate apparatus which can be attached to or mounted on a commercially available tape recorder. All that is necessary is to provide means for transmitting motion from the spindle for the supply reel to the counters of a separate apparatus. This can be achieved in a number of ways. In accordance with a first presently preferred embodiment, the movement of spindle for the supply reel can be transmitted to the counters by an opto-electrical device which electronically controls the counters and the operation of the recorder. The recorder can be directly controlled, if any remote control connector is available at the recorder, or electromechanically by solenoids acting on the normal controls of the recorder. In accordance with another presently preferred embodiment, a flexible shaft is connected to the spindle for the supply reel, and the recorder can be controlled by the separate apparatus in the same way as in accordance with the first embodiment.

An important advantage of the improved apparatus is that it allows for repeated automatic reproduction of information on a predetermined part of magnetic tape. The position and/or the length of such predetermined part can be selected at will and with a surprisingly high degree of accuracy. For example, if the information to be reproduced is sound, the user can select one or more words, a single sentence, two or more sentences, or all of the recorded information. The tape is transported rearwardly in automatic response to completion of reproduction of information on a predetermined part of the tape, i.e., all a user has to do is to actuate the buttons 24, 25 at the start and on completion of reproduction of a selected part of information on the tape. The improved apparatus can be used with advantage as a teaching aid, for example, for intensive training of language students while a student performs some work which does not prevent him or her from listening to the reproduction of sound as well as while the student is resting. The apparatus can be set to reproduce the information on a selected part of magnetic tape before the student falls asleep or to awaken the student and to thereupon reproduce selected information a desired number of times before allowing the student to fall asleep again. The apparatus can function in the afore-described manner irrespective of whether it forms an integral part of a tape recorder or an attachment to a conventional tape recorder. The construction which is shown in FIGS. 6 and 8 (wherein the apparatus is integrated into a recorder) is preferred at this time because it dispenses with long and relatively complex means for transmitting motion from the spindle for the takeup reel to the counter means as well as with solenoids or analogous means for connecting the controls of the improved apparatus with the customary controls of a discrete recorder.

Finally, it is equally within the purview of the invention to use the reproduced information for repeatedly controlling the operation of machine tools or the like. For example, the apparatus can embody means for repeatedly scanning the information which is stored on a selected portion of magnetic tape and to produce signals which are used for repeated actuation of a machine for the shaping and /or other treatment of workpieces.

The tape may but need not be stored in a cassette.

Without further analysis, the foregoing will so fully reveal the gist of the present invention that others can, by applying current knowledge, readily adapt it for various applications without omitting features which fairly constitute essential characteristic of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Apparatus for automatically repeating the reproduction of information which is stored on a selected portion of an elongated magnetic record carrier which is mounted on and extends between rotary supply and takeup devices, comprising drive means actuatable to move the carrier lengthwise; control means actuatable to select the direction of movement of the carrier through the medium of said drive means; first and second counters each having a zero position; first and second operating means actuatable to respectively start said first and second counters at the start and on completion of reproduction of information on said selected portion of the carrier; means for respectively operating said first and second counters forwardly and backwards in response to rotation of said supply device in a direction to pay out the carrier and for respectively operating said first and second counters backwards and forwardly in response to rotation of said supply device in a direction to collect the carrier; first actuating means for causing said drive means to effect a forward transport of the carrier in response to resetting of said first counter to zero position; and second actuating means for causing said drive means to effect a rearward movement of the carrier in response to resetting of said second counter to zero position.

2. Apparatus as defined in claim 1, wherein each of said counters comprises a first rotary element driven by said counter operating means and a second rotary element movable by the respective operating means into and from torque-receiving engagement with the first rotary element, said first actuating means comprising a first electric switch having a first contact and a second contract receiving motion from said second rotary element of said first counter and arranged to engage said first contact in the zero position of said first counter, said second actuating means comprising a second electric switch having a third contact and a fourth contact receiving motion from said second rotary element of said second counter and arranged to engage said third contact in the zero position of said second counter.

3. Apparatus as defined in claim 2, further comprising means for permanently biasing said second rotary elements of said counters in directions to respectively maintain said second and fourth contacts in engagement with said first and third contacts.

4. Apparatus as defined in claim 1, wherein said first and second actuating means respectively comprise first and second electric switches and further comprising a mobile support having at least one carrier-engaging portion, cam means for moving said portion into and from engagement with the carrier, and third and fourth switches respectively connected in series with said first and second switches, said cam means including means for opening said third switch when said fourth switch is closed and vice versa.

5. Apparatus as defined in claim 4, wherein said drive means comprises a relay which is energizable to effect the movements of said portion of said support into and from engagement with the carrier by way of said cam means.

6. Apparatus as defined in claim 4, wherein said support comprises means for actuating said control means in response to movement of said support so that said drive means moves the carrier backwards when said portion of said support is disengaged from the carrier.

7. Apparatus as defined in claim 6, wherein said support comprises means for holding said control means in a position in which said drive means transports the carrier forwardly when said portion of said support engages the carrier.

8. Apparatus as defined in claim 6, further comprising selector means actuatable to bias said control means to a position in which said drive means transports the carrier backwards.

9. Apparatus as defined in claim 1, wherein said control means comprises a shifter having means for connecting said drive means with said supply device while said takeup device is disconnected from said drive means and vice versa.

10. Apparatus as defined in claim 1, wherein said first and second operating means respectively comprise first and second manually operable members each movable from a first to a second position to thereby start the respective counter, and further comprising arresting means for normally holding said manually operable members in said second positions.

11. Apparatus as defined in claim 10, wherein said first and second actuating means respectively comprise first and second electric switches which are closed in the zero positions of said first and second counters, and further comprising a master switch connected in parallel with said first and second switches and actuatable by said arresting means in response to movement of said second manually operable member to said second position thereof.

12. Apparatus as defined in claim 10, further comprising selector means actuatable by hand to disengage said arresting means from said manually operable members.

13. Apparatus as defined in claim 12, wherein said selector means comprises means for urging said control means to a position in which said drive means transports the carrier rearwardly while said arresting means engages said manually operable members.

14. Apparatus as defined in claim 1, wherein said first and second counters comprise first and second clutches and said first and second operating means respectively comprise first and second resilient engaging elements for said first and second clutches.

15. Apparatus as defined in claim 1, wherein each of said counters is a digital counter.

16. Apparatus as defined in claim 1, further comprising timer means for automatically arresting said drive means after the elapse of a selected interval of time.

17. A method of automatically repeating the reproduction of information which is stored on a predetermined portion of an elongated magnetic record carrier which is movable forwardly and backwards, comprising the steps of moving the carrier forwardly and reproducing the information which is stored on the carrier; generating a first signal at the onset of reproduction of information on said predetermined portion of the carrier; monitoring the length of the carrier which is being transported forwardly subsequent to generation of said first signal; generating a second signal on completion of reproduction of information on said predetermined portion of the carrier; reversing the direction of movement of the carrier in response to said second signal; monitoring the length of the carrier which is being transported rearwardly subsequent to generation of said second signal and comparing the monitored length with the total length of the carrier which was transported forwardly during the interval between said first and second signals; generating a third signal when the monitored length of the carrier during rearward transport matches said total length; utilizing said third signal to move the carrier forwardly and reproducing the information on the rearwardly transported portion of the carrier; simultaneously monitoring the length of the carrier which is being transported forwardly subsequent to generation of said third signal and comparing the monitored length of the carrier with the total length of the rearwardly transported portion of the carrier; and generating another second signal when the monitored length of the carrier subsequent to generation of said third signal matches the total length of the carrier which was transported rearwardly during the interval between said second and third signals.

18. An automatic repeat system for replaying a segment of taped information in a tape storage device, comprising: an unwinding spindle; a winding spindle; means for reversing the direction of travel of the tape; tape driving means capable of being switched on and off, comprising, two resettable counters operating opposed to each other and capable of being coupled to said unwinding spindle, one of said counters counting the advance of the tape from the beginning to the end of the segment and the other of said counters counting the return of the tape from the end to the beginning of the segment; terminal switches cooperating with said counters; control means coupled to said terminal switches for switching on said tape driving means; and means for reversing the direction of travel of the tape.

19. An apparatus for reading an information carrier, comprising, in combination, reversible drive means for alternatively effecting forward transport or rewinding of an information carrier; reading means activatable for reading information stored on an information carrier being forwardly transported; selecting means operable by the user of the apparatus during reading of an information carrier for selecting a first location on the carrier during the reading of the first location and independently of the selection of the first location selecting a second location on the carrier during the reading of the second location, the selected locations together defining an information carrier segment; automatic rewind-reread means connected to said selecting means, to said drive means, and to said reading means and having an activated and an unactivated condition, and operative when in activated condition for effecting rewinding and rereading of the selected information carrier segment automatically and repeatedly for as long as said automatic rewind-reread means remains in activated condition; and terminating means operable by the user of the apparatus for deactivating said automatic rewind-reread means to terminate the automatic repeated rewinding and rereading of the selected segment.

* * * * *